(12) United States Patent
Farmer et al.

(10) Patent No.: US 8,580,438 B2
(45) Date of Patent: Nov. 12, 2013

(54) MONOLITHIC THREE-DIMENSIONAL ELECTROCHEMICAL ENERGY STORAGE SYSTEM ON AEROGEL OR NANOTUBE SCAFFOLD

(75) Inventors: Joseph C. Farmer, Tracy, CA (US); Michael Stadermann, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 385 days.

(21) Appl. No.: 12/967,232

(22) Filed: Dec. 14, 2010

(65) Prior Publication Data

US 2011/0143202 A1 Jun. 16, 2011

Related U.S. Application Data

(60) Provisional application No. 61/286,536, filed on Dec. 15, 2009.

(51) Int. Cl.
*H01M 2/02* (2006.01)
*H01M 4/131* (2010.01)
*H01M 4/80* (2006.01)
*H01M 4/525* (2010.01)

(52) U.S. Cl.
USPC ......... 429/235; 429/236; 429/231.1; 429/163

(58) Field of Classification Search
USPC ........ 429/218.1, 218.2, 231.8, 128, 209, 232, 429/105, 7, 231.3, 235, 236, 163; 29/623.1, 29/623.5; 428/690; 423/447.1
See application file for complete search history.

(56) References Cited

U.S. PATENT DOCUMENTS

| | | | |
|---|---|---|---|
| 7,018,742 B2 | 3/2006 | Niu | |
| 7,060,390 B2 | 6/2006 | Chen et al. | |
| 7,645,539 B2 | 1/2010 | Koshina et al. | |
| 2004/0197659 A1* | 10/2004 | Kumar et al. | 429/231.3 |
| 2006/0029857 A1 | 2/2006 | Cherepy et al. | |
| 2010/0203362 A1 | 8/2010 | Lam | |

OTHER PUBLICATIONS

"Carbon nanotube based battery architecture", Kiebele et al., Appl. Phys. Lett. 91, 144104, 2007.*
"Paper Batteries Could Power Almost Anything", Rachel Ehrenberg, Science News, Dec. 8, 2009. Retrieved online on Mar. 13, 2012 from: http://news.discovery.com/tech/paper-batteries-energy-power.html.*
"Production and Use of Carbon-Based Materials for Environmental Cleanup", Farmer et al., ACS Spring Meeting, New Orleans, LA, Mar. 24-29, 1996.*
"Electrically conductive oxide aerogels: new materials in electrochemistry", Rolison et al., Journal of Materials Chemistry, vol. 11, 963-980, Feb. 19, 2001.*
"Synthesis and Rate Performance of Monolithic Macroporous Carbon Electrodes for Lithium-Ion Secondary Batteries", Lee et al., Adv. Funct. Mater., vol. 15, No. 4, Apr. 2005.*
"Genetically engineered virus creates a better battery", Ian Monroe, Medill Reports Chicago, Apr. 9, 2009, p. 1-2. Retrieved online on Jun. 18, 2013 from: http://news.medill.northwestern.edu/chicago/news.aspx?id=125477&print=1.*

(Continued)

*Primary Examiner* — Kenneth Douyette
(74) *Attorney, Agent, or Firm* — Eddie E. Scott (57) ABSTRACT

A monolithic three-dimensional electrochemical energy storage system is provided on an aerogel or nanotube scaffold. An anode, separator, cathode, and cathodic current collector are deposited on the aerogel or nanotube scaffold.

9 Claims, 6 Drawing Sheets

(56) References Cited

OTHER PUBLICATIONS

"Flexible energy storage devices based on nanocomposite paper", Pushparaj et al., Proceedings of the National Academy of Sciences of the United States of America (PNAS), vol. 104, No. 34, Aug. 21, 2007, p. 13574-13577.*

"Experts Create Batteries from Paper and Nanotubes", Tudor Vieru, Dec. 9, 2009. Retrieved online on Jun. 18, 2013 from: http://news.softpedia.com/news/Experts-Create-Batteries-from-Paper-and-Nanotubes-129211.shtml.*

"Carbon Nanotube and Cellulose-Based Energy Storage", Simmons et al., TAPPI.org, Jul. 2008, Slides A-F. Retrieved online on Jun. 18, 2013 from: http://www.tappi.org/content/events/08nano/papers/08nan39.pdf.*

* cited by examiner

MONOLITHIC THREE-DIMENSIONAL ELECTROCHEMICAL ENERGY STORAGE SYSTEM ON AEROGEL OR NANOTUBE SCAFFOLD

CROSS-REFERENCE TO RELATED APPLICATIONS

The present application claims benefit under 35 U.S.C. §119(e) of U.S. Provisional Patent Application No. 61/286,536 filed Dec. 15, 2009 entitled "Monolithic three-dimensional batteries assembled layer-by-layer onto carbon aerogel scaffolds," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to electrochemical energy storage systems and more particularly to a monolithic three-dimensional electrochemical energy storage system on an aerogel or nanotube scaffold.

2. State of Technology

Electrochemical energy storage systems are used for a wide variety of applications including but not limited to wireless communications, portable computing, uninterruptable power systems, various robotic systems, including but not limited to well-known robots such as Talon, electric and hybrid electric vehicles, more exotic vehicular applications such as manned and unmanned underwater vehicles, and various aerospace applications including satellites. Some of the specific energy storage technologies include a wide range of primary and secondary battery systems. The primary battery systems include: (1) conventional primary batteries; (2) air breathing batteries, such as zinc-air and lithium-air systems; (3) seawater batteries, including magnesium-seawater systems; and (3) thermal batteries. Secondary batteries to be discussed in the course include: (1) lead-acid; (2) silver-zinc; (3) nickel-cadmium; (4) nickel-metal hydride; (5) lithium-ion; (6) sodium-beta batteries, including the sodium-sulfur and ZEBRA systems; (6) nickel-hydrogen; and (7) regenerative fuel cells. The two most energy dense anode materials are hydrogen, followed by lithium. The most energy dense cathode material is oxygen. While in terrestrial fuel cells, the oxygen can be extracted from the atmosphere, in space-based and undersea systems, this oxidant must be stored. Batteries are traditionally energy storage devices with high energy density but low power density. Most of the energy is stored in bulk electrode material, and both chemical reaction as well as ionic transport through the porous active layer limit power output. The power density of a battery could be substantially improved if the transport resistance could be decreased while maintaining or increasing the surface area of the electrodes. Previous attempts to do so have utilized much thinner active layers (5-10 um thick) or solid electrolytes with low thicknesses, such as LiPON. The total surface area of these devices has typically been very low, however, and resulted in a severe reduction of energy density. A successful solution will require the combination of a large surface area and a thin electrolyte layer

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a monolithic three-dimensional electrochemical energy storage system on an aerogel or nanotube scaffold. An anode, separator, cathode, and cathodic current collector are deposited on an aerogel or nanotube scaffold. Different sets of materials are used in specific embodiments of the electrochemical energy storage system. In a first embodiment a lithium-ion battery is formed. In a second embodiment a nickel metal hydride battery is formed. In a second embodiment a $\beta$ $Al_2O_3$ sodium battery is formed.

The electrochemical energy storage system of the present invention has a higher energy density and a higher power density compared to prior art batteries. Conformally coated aerogel or nanotubes provide a high electrode surface area, which, coupled with a sub-micron separator yields excellent power performance. High energy density is achieved by requiring only minimal volume and mass for non-active components (current collector, separator) of the battery. The battery of the present invention has (1) high surface area, (2) very high current, (3) is safer than prior art batteries, and (4) is smaller than prior art batteries. The present invention provides a superior energy storage device with a broad range of applications, from handheld devices such as cell phones and laptops over automotive applications in hybrid electric vehicles to energy storage systems for pulsed-power energy weapons aboard Navy vessels.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

In its simplest form a "battery" is an electrochemical device that converts chemical energy into electricity. A battery consists of two electrodes (an anode and a cathode) and an electrolyte. The electrodes are made from different kinds of metal or metallic compound and are placed in contact with an electrolyte. Conductors connect the electrodes to an electrical load. The anode is the negative terminal and the cathode is the positive terminal. Over the years, battery specialists have experimented with many different combinations of material and have generally tried to balance the potential energy output of a battery with the costs of manufacturing the battery, battery weight, shelf life, environmental impact, output, and other factors.

The present invention provides an electrochemical energy storage system that integrates a thin electrolyte with a high-surface area current collector. An aerogel or nanotube with a macroporous surface is used as a current collector. Onto this current collector, the anode, separator, cathode, and cathodic current collector are deposited. This approach maintains a low electrode separation while maximizing the available electrode surface area per volume, resulting in a device that has the high energy density of a battery and the high power density of a capacitor.

Different sets of materials can be used in specific embodiments of the electrochemical energy storage system. In a first embodiment a Li-ion battery with a tin anode, a LIPON electrolyte layer and a manganese dioxide cathode is provided. A metal current collector can be added on top of the cathode if necessary. A 70 nm thick tin anode is deposited onto a carbon aerogel scaffold electrochemically, by solution-based methods, or by atomic layer deposition (ALD). Then, a pinhole-free 20 nm LiPON layer is deposited via ALD or chemical vapor deposition. Lithium is now intercalated electrochemically through the LiPON layer into the tin anode. Next, a 70 nm manganese dioxide cathode is deposited either by ALD or by solution. If the electrical contact provided by the cathode is insufficient, the remaining void space can be infiltrated with either a conductive polymer solution, a low melting alloy, or coated with a metal by ALD. The resulting battery has an active material content of 70% by volume or 85% by mass, resulting in a higher energy density than conventional Li-ion batteries. The LiPON electrolyte does not form a solid-electrolyte interface layer, which reduces capacity losses during cycling and, along with the low thickness of the electrolyte, substantially improves the power density of the battery.

The second embodiment is a nickel metal hydride battery with a nickel-rare earth alloy as cathode, a Nafion electrolyte layer, a nickel oxide cathode, and a cathodic current collector. A 70 nm thick nickel-rare earth alloy is deposited from solution onto the carbon aerogel scaffold. The electrode is then dipped into a Nafion solution to deposit a pinhole-free Nafion layer with a thickness of 20 nm. Next, a 70 nm thick nickel oxide cathode is deposited either from solution or via ALD. Finally, the cathodic current collector is deposited as for the first assembly. This assembly also has an active material content by weight and volume comparable to the first assembly.

Electrochemical energy storage technologies are relevant for a wide variety of applications including but not limited to wireless communications, portable computing, uninterruptable power systems, various robotic systems, including but not limited to well-known robots such as Talon, electric and hybrid electric vehicles, more exotic vehicular applications such as manned and unmanned underwater vehicles, and various aerospace applications including satellites.

Specific energy storage technologies include a wide range of primary and secondary battery systems. The primary battery systems include: (1) conventional primary batteries; (2) air breathing batteries, such as zinc-air and lithium-air systems; (3) seawater batteries, including magnesium-seawater systems; and (3) thermal batteries. Secondary batteries to be discussed in the course include: (1) lead-acid; (2) silver-zinc; (3) nickel-cadmium; (4) nickel-metal hydride; (5) lithium-ion; (6) sodium-beta batteries, including the sodium-sulfur and ZEBRA systems; (6) nickel-hydrogen; and (7) regenerative fuel cells.

Primary and secondary batteries are constructed through the appropriate combination of anode and cathode materials, with the performance of such devices dependent upon the performance of the constituent active materials. The importance of hydrogen-powered fuel cells and lithium-ion batteries to the future of energy storage is clear. The most energy dense cathode material is oxygen. While in terrestrial fuel cells, the oxygen can be extracted from the atmosphere, in space-based and undersea systems, this oxidant must be stored.

Fuel cells can be used as either an energy conversion device, with no reversible energy storage, or as an energy storage device that operates essentially like a secondary battery. In the energy storage mode, fuel cells are used to extract chemical energy from an energy-dense fuel such as hydrogen, with the product from the combustion discharge to the surrounding environment. Of course, in hydrogen fuel cells, the product of the reaction of hydrogen and oxygen is pure water, which has value.

The fuel cell can also serve as the heart of a secondary battery, known as a regenerative fuel cell. In this case, the hydrogen-burning fuel cell is operated in an electrolysis mode to electrochemically split water into hydrogen and oxygen, which are both stored. During discharge, the stored hydrogen and oxygen are then passed back through the fuel cell and recombined, producing both electrical current, as well as pure water, which is stored for subsequent electrolysis cycles. The open circuit voltage of a hydrogen fuel cell is approximately 1.23 volts, which is the difference in the half-cell voltage for oxygen reduction and the half-cell voltage for hydrogen oxidation.

The range of possible primary batteries includes, but is not limited to: (1) Leclanche and $ZnCl_2$ batteries; (2) magnesium and aluminum batteries; (3) alkaline manganese dioxide batteries; (4) mercuric oxide batteries; (5) silver oxide batteries; and (6) zinc-air batteries. The global primary battery market was estimated to be approximately $22 billion in 2002. The largest segment of this market continues to be zinc-carbon batteries, even though this battery was invented well over 100 years ago. This class of primary battery was estimated to be $7.2 billion in 2002, with growth in excess of 5% per year in Asia, Eastern Europe, and the Third World Growing. The growth in the U.S. for this type of (disposable) battery is declining.

Electrochemical energy storage technologies include a wide range of secondary batteries: (1) lead-acid; (2) silver-zinc; (3) nickel-cadmium; (4) nickel-metal hydride; (5) lithium-ion; (6) sodium-beta, including sodium-sulfur and sodium-metal chloride; (6) nickel-hydrogen; (7) regenerative liquid red-ox cells; and (8) regenerative fuel cells. These technologies are relevant for a wide variety of applications, including but not limited to wireless communications, portable computing, uninterruptable power systems, various robotic systems, including but not limited to well-known robots such as Talon, electric and hybrid electric vehicles, more exotic vehicular applications such as manned and unmanned underwater vehicles, and various aerospace applications including satellites.

The nickel-hydrogen battery is a hybrid energy storage device, formed by combining a nickel battery electrode, with the hydrogen electrode of a fuel cell. The primary feature of the nickel hydrogen battery is unparalleled cycle life, which is particularly important in applications such as commercial geosynchronous earth-orbit (GEO) communications satellites, low earth-orbit (LEO) satellites, such as the Hubble space telescope, and the International Space Station (ISS), shown in FIG. 6. These devices are ideal for storing significant amounts of energy from photovoltaic cells. Nickel-hydrogen batteries have achieved more than 40,000 cycles at 40% depth of discharge (DOD) in LEO satellites, with calendar lives in excess of 15 years.

Nickel-hydrogen batteries usually operate between 0° C. and 60° C. The open circuit voltage is approximately 1.4 volts, while the operating voltage ranges from 0.85 to 1.2 volts. While they have reasonable specific energy (48-64 Wh/kg), they suffer from relatively low volumetric energy density (56-106 Wh/L). The cycle life of the nickel-hydrogen battery is typically 1500-6000 charge-discharge cycles, with 40,000 cycles possible at 40% depth of discharge (DOD). The primary risk of explosion comes from the hydrogen. The hydrogen pressure in the battery can be used as a direct measure of the state of charge (SOC).

The positive electrode consists of porous sintered nickel, impregnated with nickel hydroxide (active material loading of 1.65 to 1.57 grams per cubic centimeter of void volume), while the negative electrode consists of a photo-etched nickel current collector, with a coating of active material that consists of platinum black (7 mg/cm$^2$) with Teflon binder. A hydrophobic Teflon backing on these electrodes prevents electrolyte loss, while allowing hydrogen and oxygen permeation. The separator is usually made of either fuel-cell grade asbestos paper, or fibrous zirconium oxide separators (Zicar ZYK-15 cloth, 250 to 380 microns thick). Aqueous potassium hydroxide is used as the electrolyte, with compositions ranging from 25 to 38 weight percent. The lowest operating temperature (−66° C.) can be achieved with at the eutectic concentration of 31 weight percent. The pressure vessel is cylindrical with domed hemispherical ends, and is made of Inconel 718 alloy. The operating pressure is typically between 4.1 to 8.3 MPa, which provides a safety factor of 2 to 4. These cells can be fabricated in bipolar stacks to achieve higher terminal voltages.

The sodium-sulfur battery is categorized as a sodium-beta battery, and has a molten sodium anode, a $\beta''$-$Al_2O_3$ ceramic separator, which also serves as the solid-state, $Na^+$-conductive electrolyte, and a molten sulfur cathode. This battery is challenged by the need for a relatively high operating temperature of 290 to 390° C. The open-circuit voltage is 2.08 V, with operation between 1.95 and 1.78 V. The specific power, power density, specific energy and energy density are 390-250 W/kg, 604-386 W/L, 117-226 Wh/kg, and 147-370 Wh/L, respectively. The sodium-sulfur battery has exceptional cycle life, with a maximum life of approximately 2,250 cycles (to 80% of the original capacity), making it a reasonable choice for remote deployment where maintenance would be difficult. Despite the use of molten alkali electrodes, which can react with air and water, this battery has a very good safety record. No gaseous reaction products are formed during overcharge, and the separator tends to be self-healing. The cost of energy storage is approximately $300 per kilowatt-hour, which is modest. In summary, sodium-sulfur batteries are proven technology, with a solid history of applications in grid-storage (NGK Corporation of Japan). The sodium-sulfur battery is a reasonable contender for sub-surface applications, but will require insulated battery bottles, and auxiliary heating equivalent to approximately 10% of the batteries stored energy.

The ZEBRA battery was invented in 1985 by a group led by Dr. Johan Coetzer at the CSIR in Pretoria, South Africa. Some authors state that the ZEBRA name stands for the "Zeolite Battery Research Africa Project" which developed the technology, which seems most reasonable, while other authors state that ZEBRA name stands for "Zero Emission Battery Research Activities." The ZEBRA battery is also categorized as a sodium-beta battery, like the sodium-sulfur battery. It also has a molten sodium anode and a $\beta''$-$Al_2O_3$ ceramic separator, which also serves as the solid-state, $Na^+$-conductive electrolyte, but has a $Ni/NiCl_2$ cathode with a secondary $NaAlCl_4$ electrolyte, instead of the sulfur-based cathode used in the sodium-sulfur battery. This battery is also challenged by the need for a relatively high operating temperature of 220 to 450° C. The open-circuit voltage is approximately 2.58 V, with operation believed to occur between 2.25 and 1.72 V, slightly higher than the terminal voltage of the sodium-sulfur battery. The specific power, power density, specific energy and energy density are 171-169 W/kg, 265-261 W/L, 94-119 Wh/kg, and 148-183 Wh/L, respectively, lower than that possible with sodium-sulfur technology. The ZEBRA battery has exceptional cycle life, even better than that achieved with the sodium-sulfur battery, with a maximum life of approximately 3,500 cycles (to 80% of the original capacity), making it a reasonable choice for remote deployment where maintenance would be difficult. The cost of energy storage is only $220 per kilowatt-hour, which is less than that for the sodium-sulfur battery. In summary, sodium-sulfur batteries are proven technology, with a solid history of applications in transportation (electrical school buses for the Sacramento Utility District, and delivery vans in Europe), grid-storage (Canada), and deep-ocean applications (NATO DSRV, or deep-sea rescue vehicle). The ZEBRA battery is a reasonable contender for RPSEA sub-surface applications, but will require insulated battery bottles, and auxiliary heating equivalent to approximately 10% of the batteries stored energy.

Historically, lithium batteries with both organic liquid and solid-polymer electrolytes have been known to provide excellent specific energy and energy density. The theoretical energy possible with a Li-air battery is ~13,000 Wh/kg, ignoring the masses required for current collection, electrolyte and separator mass, the air cathode, and packaging. Designs accounting for all of the materials involved in the battery construction have a predicted specific energy of ~1,084 Wh/kg, which is still outstanding. Unfortunately, the cycle life and power density are limited. Based upon published values of current densities from such batteries, it appears that the specific power and power density of practical Li-air batteries could be as low as 13 W/kg and 39 W/L, respectively, which are substantially less than the levels required for viable grid batteries.

High-temperature batteries with molten sodium anodes and $\beta''$-$Al_2O_3$ (beta alumina) electrolyte, known as sodium beta batteries are attractive options for large-scale energy-storage applications, including electric vehicles, utility generation and distribution and aerospace. Conventional high-temperature Na-$\beta$ cells have achieved energy densities approaching those of the best Li-ion cells, with specific power comparable to that of the majority of commercially available cells. A completely reversible liquid-phase anode, coupled with a solid-state Na-ion conductive electrolyte, has enabled the Na-sulfur (NaS) battery to achieve a cycle life of 2,250-3,000 cycles at 100% depth-of-discharge and 4,500 cycles at 80% depth-of-discharge, and the Na-metal chloride battery (e.g., ZEBRA battery) to achieve even higher cycle life.

High-temperature Na-$\beta$ batteries, such as NaS and ZEBRA, have shown cycle lives far superior to those achieved with the best Li-ion batteries. The cycle life of rechargeable metal-air batteries (including Li-air) is a serious problem due to the inherent irreversibility of the electrode reaction that leads to the formation of metal oxide. The primary problem with conventional Na-$\beta$ batteries is the need for high-temperature operation (300-350° C.) to keep the anode above the melting point of sodium. Approximately 15% of the energy used by these batteries is to keep the battery heated to the required high-core temperature. Specific energy and energy density are compromised by the need for thermal insulation. The high operating temperatures also cause defects in materials that limit the overall cycle life, and result in unreliable performance and increased maintenance costs.

The sodium-sulfur battery is categorized as a sodium-beta battery, and has a molten sodium anode, a $\beta''$-$Al_2O_3$ ceramic separator, which also serves as the solid-state, $Na^+$-conductive electrolyte, and a molten sulfur cathode. This battery is challenged by the need for a relatively high operating temperature of 290 to 390° C. The open-circuit voltage is 2.08 V, with operation between 1.95 and 1.78 V. The specific power, power density, specific energy and energy density are 390-250 W/kg, 604-386 W/L, 117-226 Wh/kg, and 147-370 Wh/L, respectively. The sodium-sulfur battery has exceptional cycle life, with a maximum life of approximately 2,250 cycles (to 80% of the original capacity), making it a reasonable choice for remote deployment where maintenance would be difficult. Despite the use of molten alkali electrodes, which can react with air and water, this battery has a very good safety record. No gaseous reaction products are formed during overcharge, and the separator tends to be self-healing. The cost of energy storage is approximately $300 per kilowatt-hour, which is modest. In summary, sodium-sulfur batteries are proven technology, with a solid history of applications in grid-storage (NGK Corporation of Japan). The sodium-sulfur battery is a reasonable contender for RPSEA sub-surface applications, but will require insulated battery bottles, and auxiliary heating equivalent to approximately 10% of the batteries stored energy.

Beta alumina ($\beta''$-$Al_2O_3$) is the name given to a series of compounds that show fast-ion conduction properties. As discussed in the literature, beta alumina has the general formula $(1+x) Na_2O.Al_2O_3$ and was first reported by Rankin and Merwin in 1916, who thought that it was a polymorph of $Al_2O_3$ since they failed to detect the $Na_2O$ that was present. The variant that has become known as $\beta''$-$Al_2O_3$ was later discovered by Thery and Briancon in 1962. Both $\beta$ and $\beta''$-$Al_2O_3$ crystallize in layered structures, where Na ions move in open conduction planes, bound on both sides by two close-packed layers of O atoms, and held apart by Al—O—Al columns. The differences in $Na^+$ conductivities of $\beta$ and $\beta''$-$Al_2O_3$ are due to structural differences in the close-packed layers of O atoms. In essence, the $\beta''$-$Al_2O_3$ has a more open conduction plane, which enables greater mobility of Na ions. Interest in these solid-state electrolytes can be traced back to 1966, when research at the Ford Motor Company showed that the $Na^+$ ions were very mobile both at room temperature and above. $\beta''$-$Al_2O_3$ has a relatively high conductivity at ambient temperature, comparable to concentrated aqueous electrolytes.

The heart of the sodium beta battery is the molten sodium anode, which requires little explanation, and the "$\beta$-alumina solid-state electrolyte, in which sodium ions are extremely mobile. "$\beta$-alumina is the name given to a series of compounds which show fast-ion conduction properties. The parent compound is sodium $\beta$-alumina, $Na_2O.11Al_2O_3$ ($NaAl_{11}O_{17}$) and is found as a by-product from the glass industry. This compound was originally thought to be a polymorph of $Al_2O_3$ and was named as such; it was only later found to contain sodium ions. However, the original name is still used. The general formula for the series is $M_2O$-$nX_2O_3$, where n can range from 5 to 11; M is a monovalent cation, such as $Na^+$, $Cu^+$, $Ag^+$, $NH_4^+$, and X is a trivalent cation, such as $Al^{3+}$, $Ga^{3+}$ or $Fe^{3+}$.

The real composition of $\beta$-alumina actually varies quite considerably, from the ideal formula and the materials are always found to be rich in $Na^+$ and $O^{2-}$ ions, to a greater or lesser extent. Two modifications of the structure exist, $\beta$- and $\beta''$-alumina, depending on the number of $Na^+$ ions present; $\beta''$ occurs in the more soda-rich crystals where n=5 to 7, and $\beta$ occurs for n=8 to 11.

The ZEBRA battery is also categorized as a sodium-beta battery, like the sodium-sulfur battery. The ZEBRA cell has an open circuit voltage of 2.58 volts, and consists of a molten sodium anode, an electrolyte of $NaAlCl_4$, which melts at 160° C. (320° F.) and freezes at 157° C. (315° F.), a sodium-ion conducting $\beta''$-$Al_2O_3$ separator, and a $NiCl_2$/Ni cathode. The shorthand notation for the ZEBRA cell is: Na/$NaAlCl_4$/$\beta''$-$Al_2O_3$/$NiCl_2$/Ni. The range of operating temperature for this battery is given as 270° C. (517° F.) to 350° C. (662° F.). This battery technology had achieved a specific energy of ~85 Wh/kg and a specific power ~150 W/kg by 1998, and was already exceeding most USABC requirements at that point in time. With additional development, the performance improved. At the present time, the specific energy is 101-119 Wh/kg, the energy density is 148-183 Wh/L, and the specific power is 169-171 W/kg at 335° C. (634° F.)

The ZEBRA battery has exceptional cycle life, even better than that achieved with the sodium-sulfur battery, with a maximum life of approximately 3,500 cycles (to 80% of the original capacity), making it a reasonable choice for remote deployment where maintenance would be difficult. The cost of energy storage is only $220 per kilowatt-hour, which is less than that for the sodium-sulfur battery. In summary, sodium-sulfur batteries are proven technology, with a solid history of applications in transportation (electrical school buses for the Sacramento Utility District, and delivery vans in Europe), grid-storage (Canada), and deep-ocean applications (NATO DSRV, or deep-sea rescue vehicle). The ZEBRA battery is a reasonable contender for sub-surface applications, but will require insulated battery bottles, and auxiliary heating equivalent to approximately 10% of the batteries stored energy.

Lithium-ion batteries are proven technology used in virtually all modern cellular telephones and laptop computers, and are leading candidates for terrestrial electric vehicles. This technology has also been used in applications ranging from space exploration (Mars Rover) to sophisticated autonomous underwater vehicles (AUVs) used for oceanographic research. Several of these applications are illustrated in FIGS. 34 through 36. The current worldwide market for lithium ion battery technology is approximately U.S. $12 billion, with the potential to grow to $18 billion by 2017, as shown in FIG. 37. The greatest sectors for growth are notebook personal computing (NBPC) and automotive applications. The wireless market appears to be reaching saturation levels. Source: Hideo Takeshita, Twenty-Fifth ($25^{th}$) International Battery Seminar, Fr. Lauderdale, Fla., Mar. 17, 2008.

This battery can operate from −40 to +60° C. This battery can operate from −40 to +60° C. The open-circuit voltage is 4.1 V, with operation between 4.0 and 3.0 V (possibly as low as 2.8 V). These cells are capable of achieving 74-1100 W/kg, 147-2270 W/L, 182-225 Wh/kg, and 359-400 Wh/L, and a life of 400-1500 charge-discharge cycles (to 80% of the original capacity). However, poorly constructed cells can have much shorter lives (300 cycles representing poorer cells). Based upon published data, the cost of energy storage is believed to be approximately $300 per kilowatt-hour (though some quote $1000 per kilowatt-hour). Serious safety issues have been encountered with this technology, due in part to the volatility and reactivity of the organic-based electrolytes that are used, and the ease with which shorts can occur across the thin 20-micron polyolefin separator.

Unfortunately, lithium ion batteries have been plagued by a history of significant safety incidents, with some causing serious human injury and property damage (loss of commercial cargo plane, for example). The lithium-ion battery may prove to be relatively expensive, has safety issues that must be dealt with, but has exceptional performance characteristics, that make it a leading candidate for consideration. Designs would have to emphasize safety, thermal management during charge and discharge, and enhanced battery management systems.

The modern lithium-ion battery has: an anode that consists of a graphite-based active material ($LiC_6$) with carbon filler and PVDF binder coated onto a copper foil current collector; a cathode that consists of a transition metal oxide or iron phosphate ($LiNiO_2$, $LiCoO_2$, $LiNi_{1-x}Co_xO_2$, $LiMn_2O_2$, or $LiFePO_4$) active material with a PVDF binder coated onto an aluminum foil current collector; a microporous porous polyethylene separator, and an electrolyte consisting of a mixed organic carbonate solvent (EC:DMC:DEC) and $LiPF_6$ salt. More advanced materials are evolving, such as the lithium titanate anode ($LiTi_2O_4$) and solid state electrolytes such as LiPON™. The liquid cylindrical or prismatic cells are contained in a hermetically sealed metal can, while polymer-gel cells are contained in a soft aluminum-polyethylene laminate package, with thermally laminated seams.

The present invention provides a monolithic three-dimensional electrochemical energy storage system on an aerogel or nanotube scaffold. An anode, separator, cathode, and cathodic current collector are deposited on an aerogel or nanotube scaffold. Different sets of materials are used in specific embodiments of the electrochemical energy storage system. An anode provides a negative terminal for the battery. The anode is deposited on the aerogel or nanotube scaffold. A cathode provides a positive terminal for the battery. The cathode is deposited on the aerogel or nanotube scaffold. Intermediate layers are positioned between the anode and the cathode. The intermediate layers provide an electrolyte and separator for the battery. In a first embodiment a lithium-ion battery is formed. In a second embodiment a nickel metal hydride battery is formed. In a third embodiment a β $Al_2O_3$ sodium battery is formed.

EXAMPLE 1

Lithium Metal Oxide—Cathode

Figure 1:
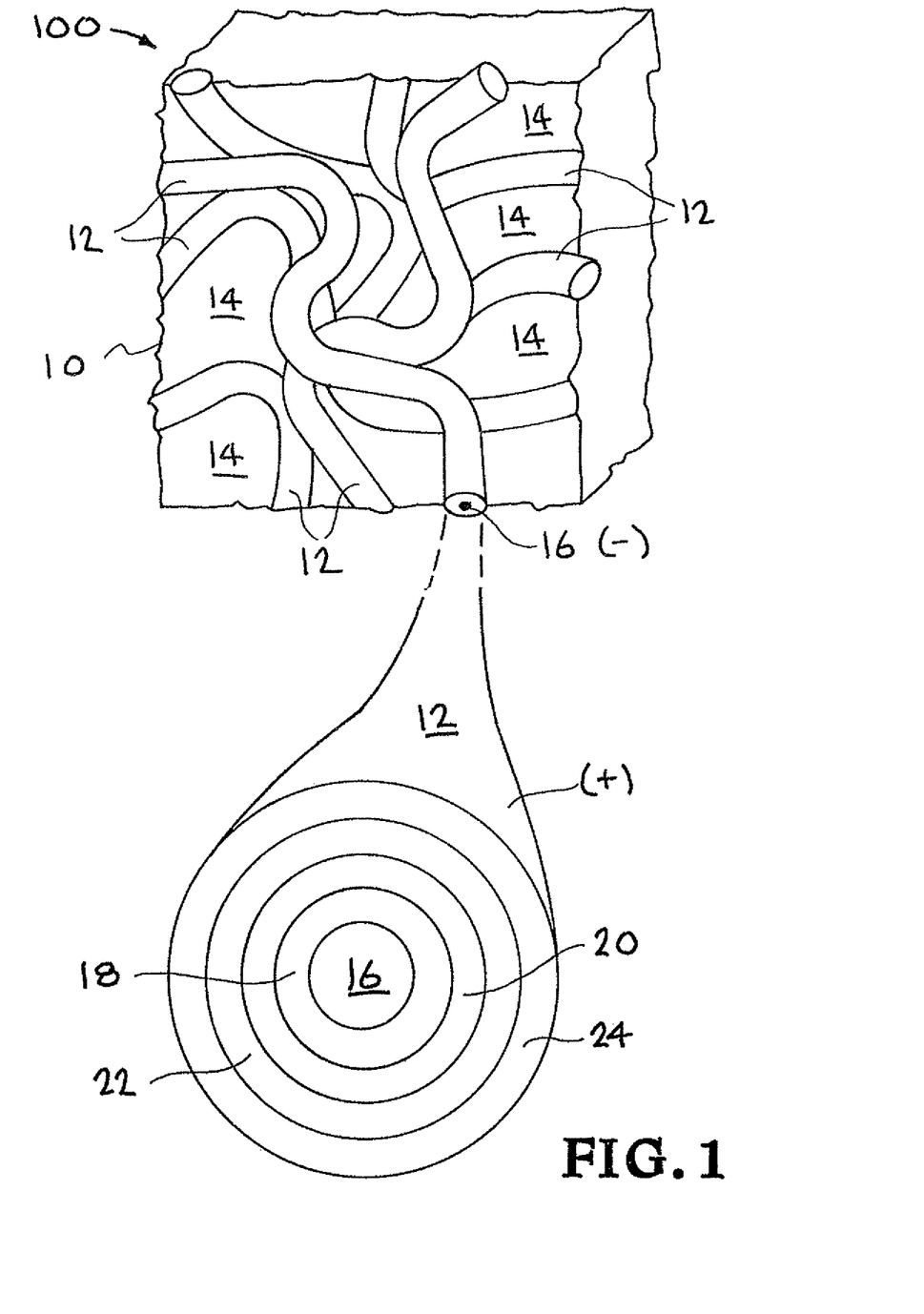
FIG. 1 illustrates one embodiment of electrochemical energy storage apparatus constructed in accordance with the present invention.

Referring now to the drawing figures and in particular to FIG. 1, one embodiment of electrochemical energy storage apparatus constructed in accordance with the present invention is illustrated. The electrochemical energy storage apparatus is designated generally by the reverence numeral 100. The electrochemical energy storage apparatus 100 is a monolithic three-dimensional battery 100 that includes an aerogel or nanotube scaffold 10, an anode 16 operably connected to the aerogel or nanotube scaffold 10, a separator operably connected to the aerogel or nanotube scaffold 10, and a cathode 12 operably connected to the aerogel or nanotube scaffold.

The battery 100 is an electrochemical device that converts chemical energy into electricity. The battery 100 consists of two electrodes (an anode 16 and a cathode 12) and an electrolyte. The electrodes are made from different kinds of metal or metallic compound and are placed in contact with an electrolyte. Conductors connect the electrodes to an electrical load. The anode 16 is the negative terminal and the cathode 12 is the positive terminal. Over the years, battery specialists have experimented with many different combinations of materials for the electrodes and the electrolyte and have generally tried to balance the potential energy output of a battery with the costs of manufacturing the battery, battery weight, shelf life, environmental impact, output, and other factors.

The electrochemical energy storage apparatus 100 is a lithium ion monolithic three-dimensional battery 100 that includes an aerogel or nanotube scaffold 10, an anode 16 operably connected to the aerogel or nanotube scaffold 10, a separator operably connected to the aerogel or nanotube scaffold 10, and a cathode 12 operably connected to the aerogel or nanotube scaffold. The aerogel or nanotube scaffold 10 is a high specific surface area porous material. Examples are carbon aerogels, metal aerogels, metal foams, carbon foams, and CNT (Carbon Nano Tubes) ropes or mesh. The aerogel or nanotube scaffold 10 provides a substrate upon which multiple layers of material will be deposited. The aerogel or nanotube scaffold 10 has a core 16 that consists of carbon or other anode material. The anode 16 is connected to a first conductor. The cathode 12 is also connected to a second conductor. The electrodes 16 and 12 are connected to an electrical load through the first conductor and the second conductor.

A first deposited layer 18 (copper) is deposited on the core 16 of the aerogel or nanotube scaffold 10. A second deposited layer 20 (tin or silicon) is deposited on the first deposited layer 18. A third deposited layer 22 (polymer or lithium ion electrodes) is deposited on the second deposited layer 20. A fourth or transition layer 22 is deposited on the third deposited layer 22. A fifth metal oxide cathode ($L_iCµO_2$) layer 24 is deposited on the fourth layer 22 and forms the cathode 12. The pores 14 can be filled with conductive material 14'.

Figure 2:
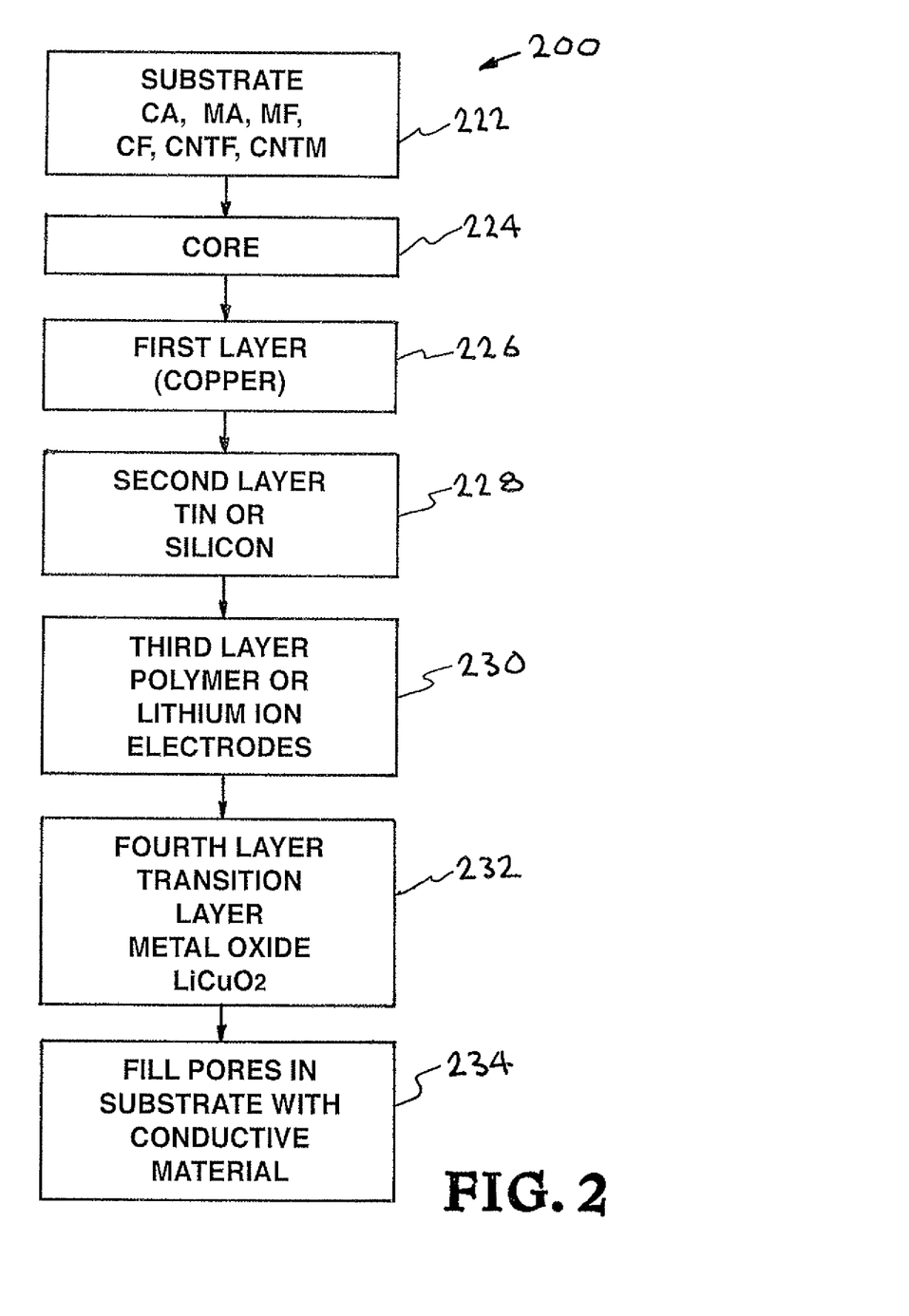
FIG. 2 illustrates the process of making the electrochemical energy storage apparatus shown in FIG. 1.

Referring now to FIG. 2, the process of making the electrochemical energy storage apparatus 100 is illustrated. The process of making the electrochemical energy storage apparatus 100 is designated generally by the reference numeral 200. The first step in the process 200 of making the electrochemical energy storage apparatus 100 is step 222 of providing an aerogel or nanotube scaffold 10 made of a high specific surface area porous material. Examples of the material are carbon aerogels, metal aerogels, metal foams, carbon foams, and CNT (Carbon Nano Tubes) ropes or mesh.

In step 224 the aerogel or nanotube scaffold 10 provides a substrate core 16 upon which multiple layers of material will be deposited in subsequent steps.

In step 226 a first layer 18 (copper) is deposited on the substrate core 16.

In step 228 a second layer 20 (tin or silicon) is deposited on the first deposited layer 18.

In step 230 a third layer 22 (polymer or lithium ion electrode) is deposited on the second deposited layer 20.

In step 232 a fourth or transition layer 24, metal oxide cathode ($L_i C \mu O_2$), is deposited on the third deposited layer 22.

In step 234 the pores 14 are filled with conductive material 14'.

EXAMPLE 2

Lithium Metal Oxide—Anode

Figure 3:
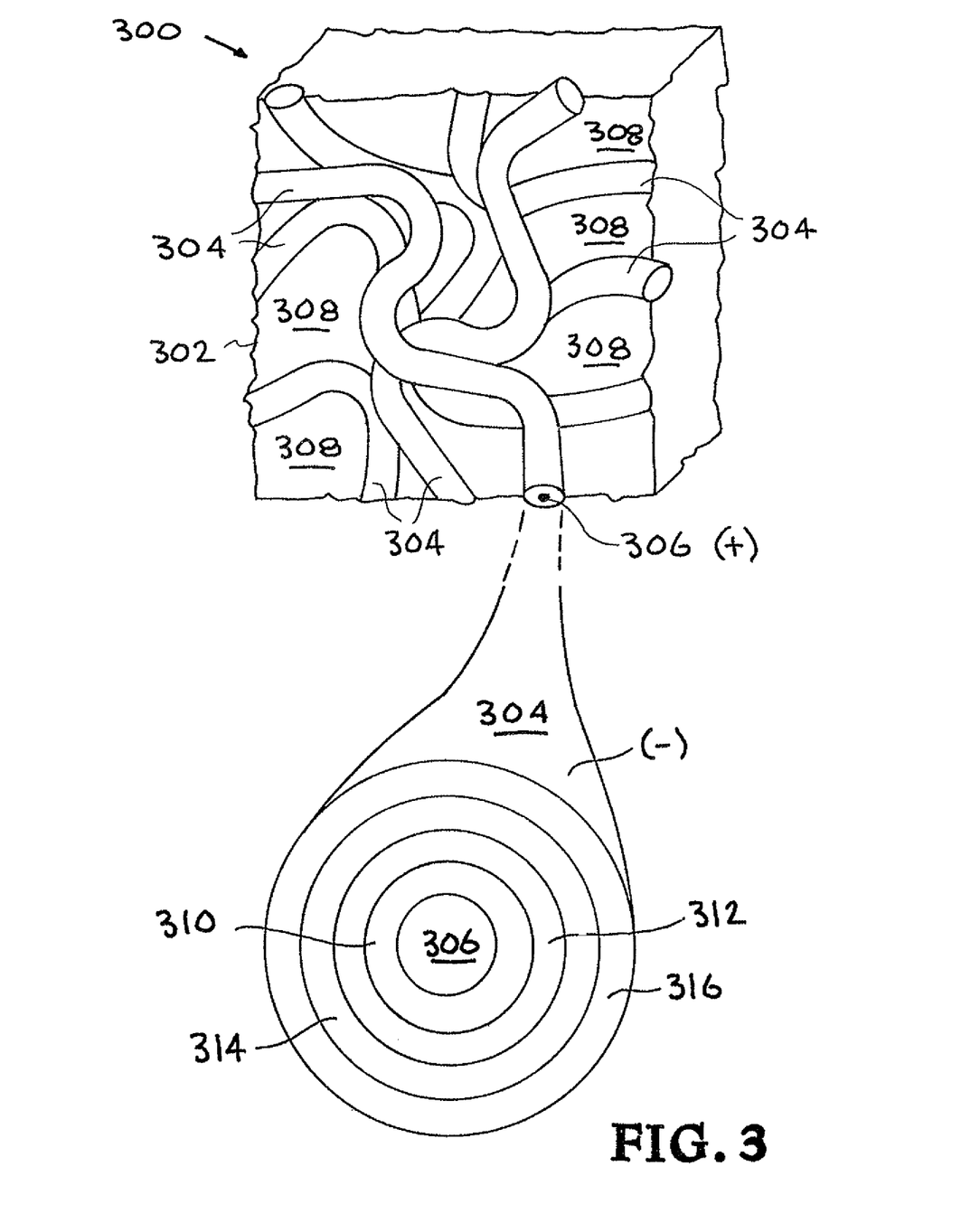
FIG. 3 illustrates another embodiment of electrochemical energy storage apparatus constructed in accordance with the present invention.

Referring now to FIG. 3, another embodiment of an electrochemical energy storage apparatus constructed in accordance with the present invention is illustrated. The electrochemical energy storage apparatus is designated generally by the reverence numeral 300. The electrochemical energy storage apparatus 300 is a lithium ion monolithic three-dimensional battery 300 that includes an aerogel or nanotube scaffold 302, a cathode 306 operably connected to the aerogel or nanotube scaffold, a separator operably connected to the aerogel or nanotube scaffold 302, and an anode 304 operably connected to the aerogel or nanotube scaffold 302.

The battery 300 is an electrochemical device that converts chemical energy into electricity. The battery 300 consists of two electrodes (an anode 304 and a cathode 306) and an electrolyte. The electrodes are made from different kinds of metal or metallic compound and are placed in contact with an electrolyte. Conductors connect the electrodes to an electrical load. The anode 304 is the negative terminal and the cathode 306 is the positive terminal. Over the years, battery specialists have experimented with many different combinations of materials for the electrodes and the electrolyte and have generally tried to balance the potential energy output of a battery with the costs of manufacturing the battery, battery weight, shelf life, environmental impact, output, and other factors.

The aerogel or nanotube scaffold 302 is a high specific surface area porous material. Examples are carbon aerogels, metal aerogels, metal foams, carbon foams, and CNT (Carbon Nano Tubes) ropes or mesh. The aerogel or nanotube scaffold 302 provides a substrate upon which multiple layers of material will be deposited. The aerogel or nanotube scaffold 302 has a core 306 that consists of carbon or other material.

A first deposited layer 310 is deposited on the core 306. The first deposited layer 310 consists of metal oxide cathode ($L_i C \mu O_2$) or other cathode material. The core 306 and the first deposited layer 310 provide the cathode for the battery 300. A second (polymer) deposited layer 312 is deposited on the first deposited layer 310. A third deposited layer (tin or silicon) 314 is deposited on the third deposited layer 314. A fourth layer 316 is deposited on the third layer 314 and forms the anode 304. The pores 308 are filled with conductive material 308'.

The anode 306, 310 is connected to a first conductor. The cathode 304 is also connected to a second conductor. The anode and cathode electrodes are connected to an electrical load through the first conductor and the second conductor.

EXAMPLE 3

Nickel Hydride—Cathode

Figure 4:
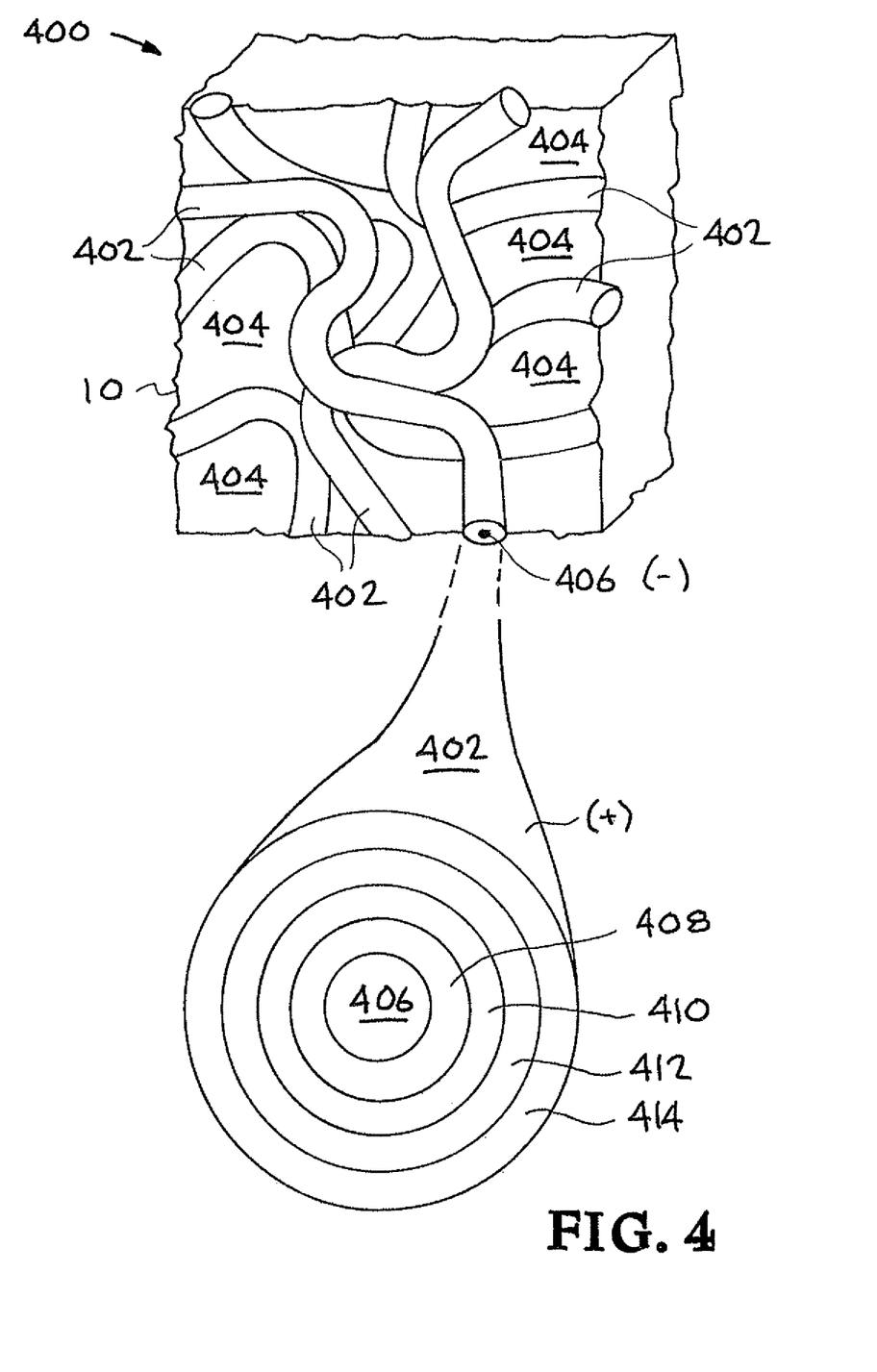
FIG. 4 illustrates yet another embodiment of electrochemical energy storage apparatus constructed in accordance with the present invention.

Referring now to FIG. 4, another embodiment of electrochemical energy storage apparatus constructed in accordance with the present invention is illustrated. The electrochemical energy storage apparatus is designated generally by the reverence numeral 400. The electrochemical energy storage apparatus 400 is a monolithic three-dimensional battery 400 that includes an aerogel or nanotube scaffold 10, an anode 406 operably connected to the aerogel or nanotube scaffold 10, a separator operably connected to the aerogel or nanotube scaffold 10, and a cathode 402 operably connected to the aerogel or nanotube scaffold.

The battery 400 is an electrochemical device that converts chemical energy into electricity. The battery 400 consists of two electrodes (an anode 406 and a cathode 402) and an electrolyte. The electrodes are made from different kinds of metal or metallic compound and are placed in contact with an electrolyte. Conductors connect the electrodes to an electrical load. The anode 406 is the negative terminal and the cathode 402 is the positive terminal. Over the years, battery specialists have experimented with many different combinations of materials for the electrodes and the electrolyte and have generally tried to balance the potential energy output of a battery with the costs of manufacturing the battery, battery weight, shelf life, environmental impact, output, and other factors.

The electrochemical energy storage apparatus 400 is a nickel hydride monolithic three-dimensional battery 400 that includes an aerogel or nanotube scaffold 10, an anode 406 operably connected to the aerogel or nanotube scaffold 10, a separator operably connected to the aerogel or nanotube scaffold 10, and a cathode 402 operably connected to the aerogel or nanotube scaffold. The aerogel or nanotube scaffold 10 is a high specific surface area porous material. Examples are carbon aerogels, metal aerogels, metal foams, carbon foams, and CNT (Carbon Nano Tubes) ropes or mesh. The aerogel or nanotube scaffold 10 provides a substrate upon which multiple layers of material will be deposited. The aerogel or nanotube scaffold 10 has a core 406 that consists of carbon or other anode material. The anode 406 is connected to a first conductor. The cathode 402 is also connected to a second conductor. The electrodes 406 and 402 are connected to an electrical load through the first conductor and the second conductor.

A first deposited layer 408 (copper) is deposited on the core 406 of the aerogel or nanotube scaffold 10. A second deposited layer 410 (tin or silicon) is deposited on the first deposited layer 408. A third deposited layer 412 (polymer or nickel hydride electrodes) is deposited on the second deposited layer 410. A fourth nickel hydride layer 414 is deposited on the third layer 412 and forms the cathode 402. The pores 14 can be filled with conductive material 14'.

The process of making the electrochemical energy storage apparatus 400 begins with the step of providing an aerogel or nanotube scaffold 10 made of a high specific surface area porous material. Examples of the material are carbon aerogels, metal aerogels, metal foams, carbon foams, and CNT (Carbon Nano Tubes) ropes or mesh. The aerogel or nanotube scaffold 10 provides a substrate core 406 upon which multiple layers of material are deposited in subsequent steps. In the next step a first layer 408 (copper) is deposited on the substrate core 406. In the next step a second layer 410 (tin or silicon) is deposited on the first deposited layer 408. In the next step a fourth nickel hydride layer 414 is deposited on the third deposited layer 412. In an additional step the pores 404 are filled with conductive material 404'.

EXAMPLE 4

Nickel Hydride Oxide—Anode

Figure 5:
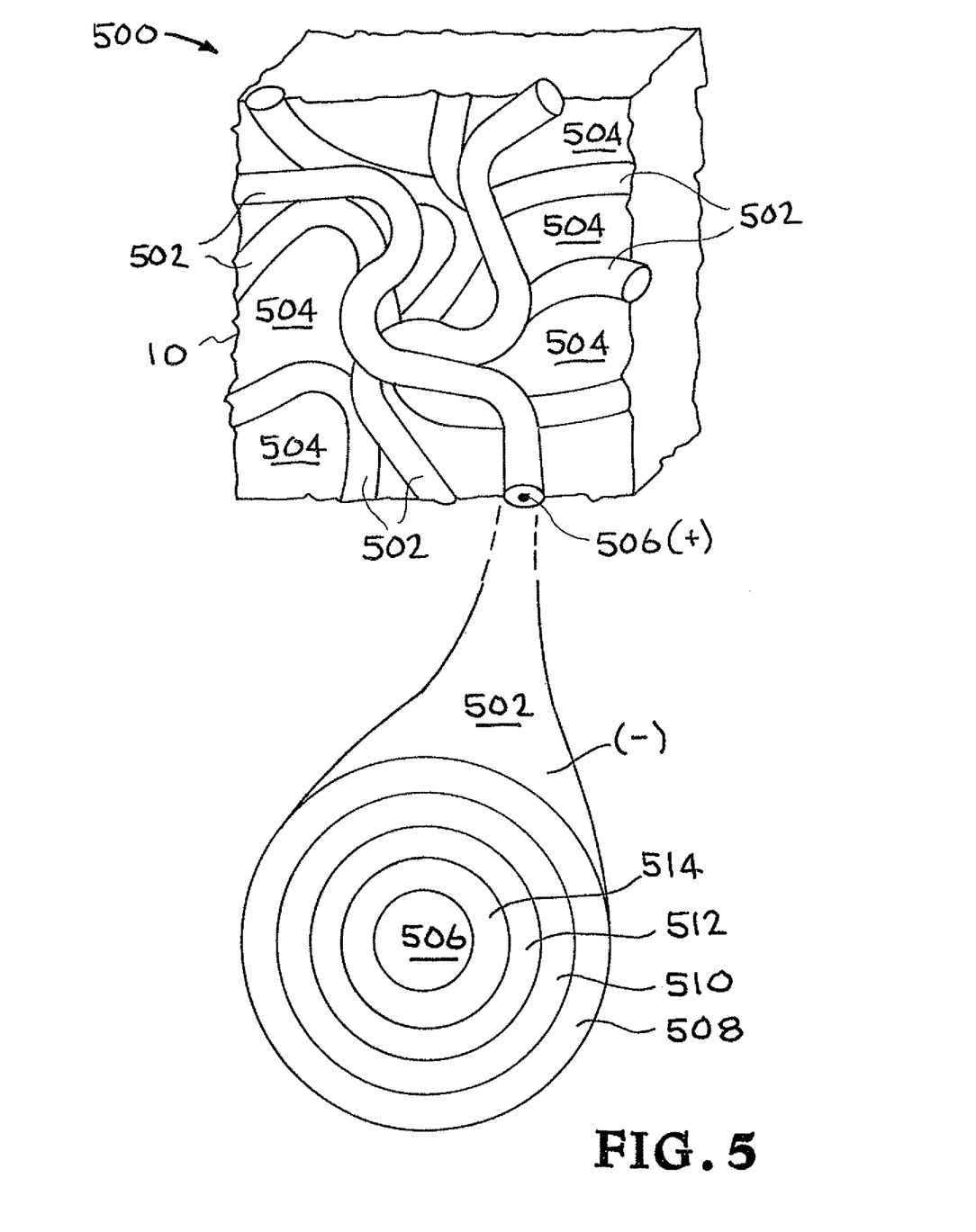
FIG. 5 illustrates another embodiment of electrochemical energy storage apparatus constructed in accordance with the present invention.

Referring now to FIG. 5, another embodiment of an electrochemical energy storage apparatus constructed in accordance with the present invention is illustrated. The electrochemical energy storage apparatus is designated generally by the reverence numeral 500. The electrochemical energy storage apparatus 500 is a nickel hydride monolithic three-dimensional battery 500 that includes an aerogel or nanotube scaffold 10, a cathode 506 operably connected to the aerogel or nanotube scaffold, a separator operably connected to the aerogel or nanotube scaffold 10, and an anode 502 operably connected to the aerogel or nanotube scaffold 10.

The battery 500 is an electrochemical device that converts chemical energy into electricity. The battery 500 consists of two electrodes (an anode 502 and a cathode 506) and an electrolyte. The electrodes are made from different kinds of metal or metallic compound and are placed in contact with an electrolyte. Conductors connect the electrodes to an electrical load. The anode 502 is the negative terminal and the cathode 506 is the positive terminal. Over the years, battery specialists have experimented with many different combinations of materials for the electrodes and the electrolyte and have generally tried to balance the potential energy output of a battery with the costs of manufacturing the battery, battery weight, shelf life, environmental impact, output, and other factors.

The aerogel or nanotube scaffold 10 is a high specific surface area porous material. Examples are carbon aerogels, metal aerogels, metal foams, carbon foams, and CNT (Carbon Nano Tubes) ropes or mesh. The aerogel or nanotube scaffold 10 provides a substrate upon which multiple layers of material will be deposited. The aerogel or nanotube scaffold 10 has a core 506 that consists of carbon or other material.

A first deposited layer 514 is deposited on the core 506. The first deposited layer 514 consists of nickel hydride or other cathode material. The core 506 and the first deposited layer 514 provide the cathode for the battery 500. A second (polymer) deposited layer 512 is deposited on the first deposited layer 514. A third deposited layer (tin or silicon) 510 is deposited on the third deposited layer 510. A fourth layer 508 is deposited on the third layer 510 and forms the anode 502. The pores 308 are filled with conductive material 308'.

The anode 506, 514 is connected to a first conductor. The cathode 502 is also connected to a second conductor. The anode and cathode electrodes are connected to an electrical load through the first conductor and the second conductor.

EXAMPLE 5

β Al$_2$O$_3$ Sodium Battery

Figure 6:
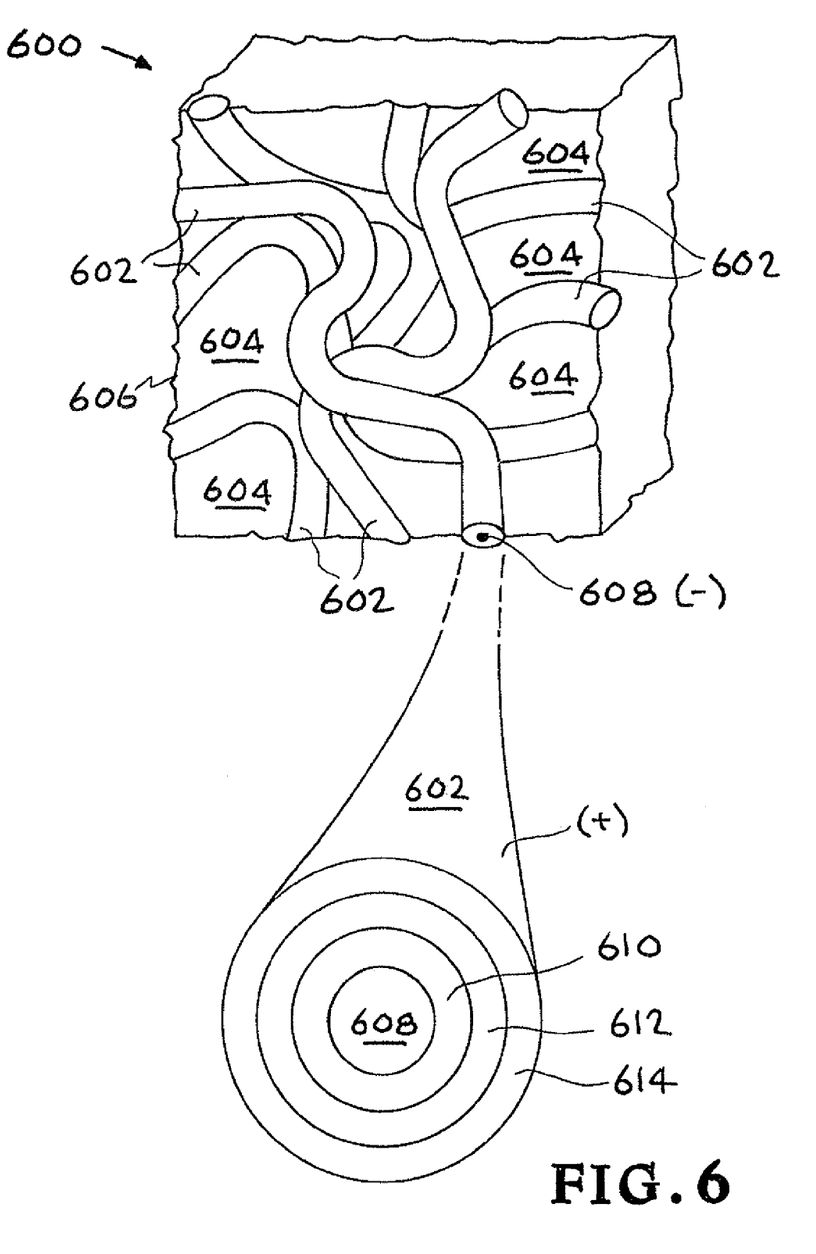
FIG. 6 illustrates yet another embodiment of electrochemical energy storage apparatus constructed in accordance with the present invention.

Referring now to FIG. 6, another embodiment of electrochemical energy storage apparatus constructed in accordance with the present invention is illustrated. The electrochemical energy storage apparatus is designated generally by the reverence numeral 600. The electrochemical energy storage apparatus 600 is a monolithic three-dimensional β Al$_2$O$_3$ Sodium battery 600 that includes an aerogel or nanotube scaffold 606, an anode 608 operably connected to the aerogel or nanotube scaffold 606, a separator operably connected to the aerogel or nanotube scaffold 606, and a cathode 602 operably connected to the aerogel or nanotube scaffold.

The battery 600 is an electrochemical device that converts chemical energy into electricity. The battery 600 consists of two electrodes (an anode 608 and a cathode 602) and an electrolyte. The electrodes are made from different kinds of metal or metallic compound and are placed in contact with an electrolyte. Conductors connect the electrodes to an electrical load. The anode 608 is the negative terminal and the cathode 602 is the positive terminal. Over the years, battery specialists have experimented with many different combinations of materials for the electrodes and the electrolyte and have generally tried to balance the potential energy output of a battery with the costs of manufacturing the battery, battery weight, shelf life, environmental impact, output, and other factors.

The electrochemical energy storage apparatus 600 is a β Al$_2$O$_3$ Sodium battery 600 that includes an aerogel or nanotube scaffold 606, an anode 608 operably connected to the aerogel or nanotube scaffold 606, a separator operably connected to the aerogel or nanotube scaffold 606, and a cathode 602 operably connected to the aerogel or nanotube scaffold. The aerogel or nanotube scaffold 606 is a high specific surface area porous material. Examples are carbon aerogels, metal aerogels, metal foams, carbon foams, and CNT (Carbon Nano Tubes) ropes or mesh. The aerogel or nanotube scaffold 606 provides a substrate upon which multiple layers of material will be deposited. The aerogel or nanotube scaffold 606 has a core 608 that consists of carbon or other anode material. The anode 608 is connected to a first conductor. The cathode 602 is also connected to a second conductor. The electrodes 608 and 602 are connected to an electrical load through the first conductor and the second conductor.

A first deposited layer 610 (iron) is deposited on the core 608 of the aerogel or nanotube scaffold 606. A second deposited layer 612 (FeCL$_2$) is deposited on the first deposited layer 610. A third deposited layer 614 (dimensional β Al$_2$O$_3$ Sodium electrolyte) is deposited on the second deposited layer 612 and forms the cathode 602.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A battery apparatus, comprising:
an battery apparatus body;
a nanotube scaffold including at least one nanotube located within said battery apparatus body wherein said nanotube has an internal channel;
pores in said battery apparatus body outside of said nanotube;
an anode located in said internal channel of said nanotube that provides a negative terminal for the battery, said anode deposited in said internal channel of said nanotube;

intermediate layers deposited on said anode, said intermediate layers providing an electrolyte and separator for the battery; and a cathode surrounding said intermediate layers and operably connected to said nanotube scaffold that provides a positive terminal for the battery, said cathode deposited on said intermediate layers.

2. The battery apparatus of claim 1 wherein said battery apparatus body is a three-dimensional battery apparatus body.

3. The battery apparatus of claim 1 wherein said battery apparatus body is a monolithic three-dimensional electrochemical energy storage battery apparatus body.

4. The battery apparatus of claim 1 wherein said cathode is a lithium metal oxide cathode.

5. The battery apparatus of claim 1 further comprising a conductive material filling said pores in said battery apparatus body.

6. A battery apparatus, comprising:

a battery apparatus body;

a nanotube scaffold including at least one nanotube located within said battery apparatus body wherein said nanotube has an internal channel;

pores in said battery apparatus body outside of said nanotube;

a cathode operably connected to said nanotube scaffold that provides a positive terminal for the battery, said cathode located in said internal channel of said nanotube;

intermediate layers deposited on said cathode, said intermediate layers providing an electrolyte and separator for the battery; and an anode that provides a negative terminal for the battery, said anode deposited on said intermediate layers.

7. The battery apparatus of claim 6 wherein said battery apparatus body is a three-dimensional electrochemical battery apparatus body.

8. The battery apparatus of claim 6 wherein said battery apparatus body is a monolithic three-dimensional electrochemical battery apparatus body.

9. The electrochemical energy storage apparatus of claim 6 further comprising a conductive material filling said pores in said electrochemical energy storage apparatus body.

\* \* \* \* \*